(12) United States Patent  
Goppert

(10) Patent No.: US 10,260,573 B2
(45) Date of Patent: Apr. 16, 2019

(54) METHOD FOR ADJUSTING A FRICTION COEFFICIENT OF AN AUTOMATED CLUTCH

(71) Applicant: Schaeffler Technologies AG & Co. KG, Herzogenaurach (DE)

(72) Inventor: Georg Goppert, Hausach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 90 days.

(21) Appl. No.: 15/520,620

(22) PCT Filed: Oct. 20, 2015

(86) PCT No.: PCT/DE2015/200480
§ 371 (c)(1),
(2) Date: Apr. 20, 2017

(87) PCT Pub. No.: WO2016/078652
PCT Pub. Date: May 26, 2016

(65) Prior Publication Data
US 2017/0328422 A1    Nov. 16, 2017

(30) Foreign Application Priority Data
Nov. 18, 2014 (DE) .................. 10 2014 223 468

(51) Int. Cl.
*F16D 48/06* (2006.01)

(52) U.S. Cl.
CPC .... *F16D 48/06* (2013.01); *F16D 2500/10412* (2013.01); *F16D 2500/3051* (2013.01); *F16D 2500/3056* (2013.01); *F16D 2500/3065* (2013.01); *F16D 2500/30402* (2013.01); *F16D 2500/30404* (2013.01); *F16D 2500/30406* (2013.01); *F16D 2500/50236* (2013.01); *F16D 2500/70605* (2013.01)

(58) Field of Classification Search
None
See application file for complete search history.

(56) References Cited

U.S. PATENT DOCUMENTS 6,922,623 B2  7/2005  Rieger et al.
8,392,083 B2  3/2013  Hodrus et al.
(Continued)

FOREIGN PATENT DOCUMENTS

DE      10213946      10/2002
DE     102006045858   4/2007
(Continued)

OTHER PUBLICATIONS

DE102011107232 translation.*

*Primary Examiner* — Timothy Hannon
(74) *Attorney, Agent, or Firm* — Volpe and Koenig, P.C.

(57) ABSTRACT

The invention relates to a method for adjusting a friction coefficient of an automated clutch, wherein a current friction coefficient (RK) is determined by a comparison with a moment of the internal combustion engine during a slipping phase of the clutch. In a method, in which the adaptation over the entire operation of the motor vehicle is possible, the current friction coefficient (RK) is pilot-controlled to a long-term friction coefficient (RL) in a non-slipping phase of the clutch and/or in the event of a torque signal that cannot be monitored.

13 Claims, 1 Drawing Sheet

(56) References Cited

U.S. PATENT DOCUMENTS

| | | | |
|---|---|---|---|
| 9,080,617 B2 | 7/2015 | Reibold et al. | |
| 2013/0253791 A1* | 9/2013 | Hodrus | F16D 48/06 701/67 |
| 2014/0005000 A1* | 1/2014 | Reibold | F16D 48/06 477/174 |

FOREIGN PATENT DOCUMENTS

| | | |
|---|---|---|
| DE | 102010024941 | 1/2011 |
| DE | 102011080716 | 4/2012 |
| DE | 102012202413 | 9/2012 |
| DE | 102012207825 | 12/2012 |
| DE | 102011107232 | 1/2013 |
| DE | 102012210201 | 1/2013 |
| DE | 102013204831 | 10/2013 |

* cited by examiner

METHOD FOR ADJUSTING A FRICTION COEFFICIENT OF AN AUTOMATED CLUTCH

BACKGROUND

The invention relates to a method for adapting a friction coefficient of an automated clutch, in which a current friction value is determined by comparison with a torque of the internal combustion engine during a slipping phase of the clutch.

In automated clutch applications, such as in duplex clutch and multiple clutch applications, the precise knowledge of the clutch torque is mandatory for good shifting and/or starting quality of a motor vehicle. Here the ability to predict the clutch coefficient is of great importance, because the control of the clutch occurs based on said clutch coefficient, since the typical shifting times and/or starting times of the clutch are below 1 second, which prevents any adaptation of the clutch coefficient in real time. The clutch coefficient is typically parameterized by a sensor point and the effective friction value and also adapted. The adaptation of the friction value occurs here by comparison with the torque of the internal combustion engine during the slipping phase of the active clutch.

A method is known from DE 10 2010 024 941 A1 for controlling a duplex clutch with two sub-drivetrains, allowing each of them to be coupled via a clutch to an internal combustion engine. During drive operation of the vehicle comprising the duplex clutch a sensor point of the clutch is determined, regardless of the motor torque. This sensor point is here determined during the start of operation of the vehicle, and then adapted during operation of said vehicle.

A method is known from DE 10 2013 204 831 A1 for determining parameters of a clutch in order to set the sensor point at which a pre-stress characteristic curve is determined.

The adaptation of the friction value can occur only when the clutch is monitored. Here, allowing monitoring means that the clutch is in a slipping operation and sufficient torque is transmitted thereby. In normal drive situations of the vehicle there are times during which the clutch cannot be monitored and thus the friction coefficient cannot be adapted. During these times the clutch is subject to changes due to cooling. Simultaneously, the clutch cannot be monitored when the vehicle is stationary, although the cooling of the clutch can lead to changes of the clutch characteristics.

SUMMARY

The invention is based on the objective to perform an adaptation of the friction value even in such phases in which the clutch of the vehicle cannot be monitored.

According to the invention the objective is attained such that the current friction coefficient is preset for a long-term friction value in a non-slipping phase of the clutch and/or in case a torque signal cannot be evaluated. This is advantageous in that even changes of the clutch leading to changes of the clutch characteristics in cooling phases during the stationary condition of the vehicle are approximately compensated because the friction value is pre-controlled to the long-term friction value.

Advantageously this long-term friction value is determined as a function of the temperature of the clutch. This long-term friction value is obtained empirically via the temperature of the clutch and represents reliably a function of temperature, which thus can be used as the foundation for determining the friction value and for adaptation.

In one embodiment the long-term friction value is assumed to be approximately constant during the phase of the pilot-control. Due to the fact that it must be assumed that during the inactive phase of the clutch rapid changes in the environment of the clutch can lead to strong deviations in the characteristic line of the clutch, in this phase the current friction value is also adapted, reducing the deviation of the friction value underlying the current characteristic line of the clutch from the real friction value after the conclusion of the inactive phase of the clutch, which allows for a better control of the clutch.

In one variant a speed of adaptation of the current friction value to the long-term friction value is determined as a function of the relaxation and/or cooling rate in the clutch. Such rates are determined empirically, for example during the stationary and/or inactive operation of the clutch, and thus they can be used to adjust the friction value in a phase of the clutch that cannot be monitored. This way the control of the clutch is improved in the next phase that can be monitored.

In a further development a start value of the current friction value is determined as a function of a temperature of the clutch at the beginning of the pilot control. This way the current friction value to be pre-set to the long-term friction value is assigned a value at the beginning of the pilot control phase, which is equivalent to the real conditions of the motor vehicle at said point of time.

In another embodiment a start value of the current friction value is determined during the pilot control phase as a function of a cooling period of the clutch. Here, too, typical clutch characteristics during the pilot control phase are considered in order to show a real friction value at the end of the pilot control phase, which is almost equivalent to the real friction value.

BRIEF DESCRIPTION OF THE DRAWINGS

The invention allows numerous embodiments. One of them shall be explained in greater detail based on the figures shown in the drawings.

Shown are.

DETAILED DESCRIPTION OF THE PREFERRED EMBODIMENTS

Figure 1:
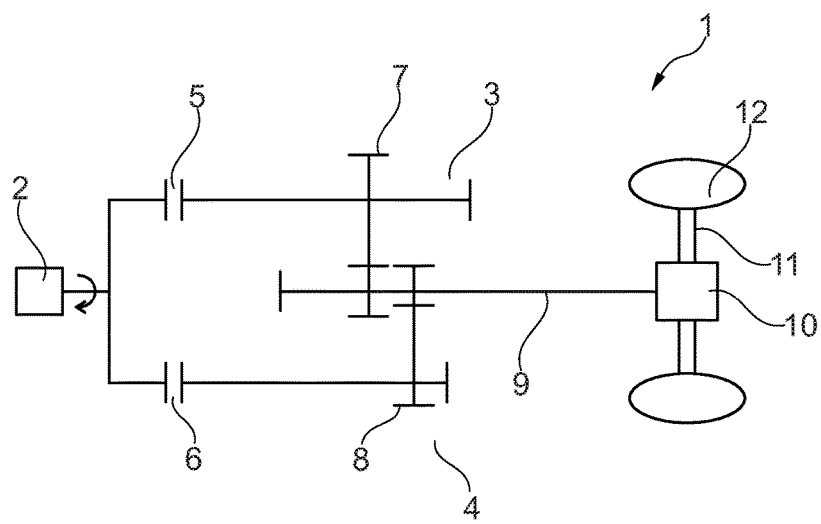
FIG. 1 a display of the principle of a duplex clutch transmission.

FIG. 1 shows the illustration of the principle of a duplex clutch transmission 1 as commonly used in motor vehicles. This duplex clutch transmission 1 is connected to the internal combustion engine 2 and comprises two sub-drivetrains 3 and 4. The connection of each sub-drivetrain 3, 4 to the internal combustion engine 2 occurs respectively via a clutch 5, 6, which can be controlled by a control unit, not shown in greater detail. The first sub-drivetrain 3 carries the odd-numbered gears 7, while the second sub-drivetrain 4 comprises the even-numbered gears 8. The gears 7 and 8 are connected to a driveshaft 9, if necessary, which drives the drive wheels 12 via a differential 10 and a wheel axle 11.

In one such duplex clutch transmission 1, a gear 7 of a sub-drivetrain 3 is connected to the drive shaft 9, while the gear 8 of the other sub-drivetrain 4 is engaged. For this purpose the behavior of both clutches 5, 6 must be adjusted precisely in order to avoid disturbances. Each clutch 5, 6 is here controlled via a clutch characteristics line, which is saved in the control unit. One parameter of the clutch characteristics line is here the friction value, which must be adapted constantly during operation of the vehicle.

Figure 2:
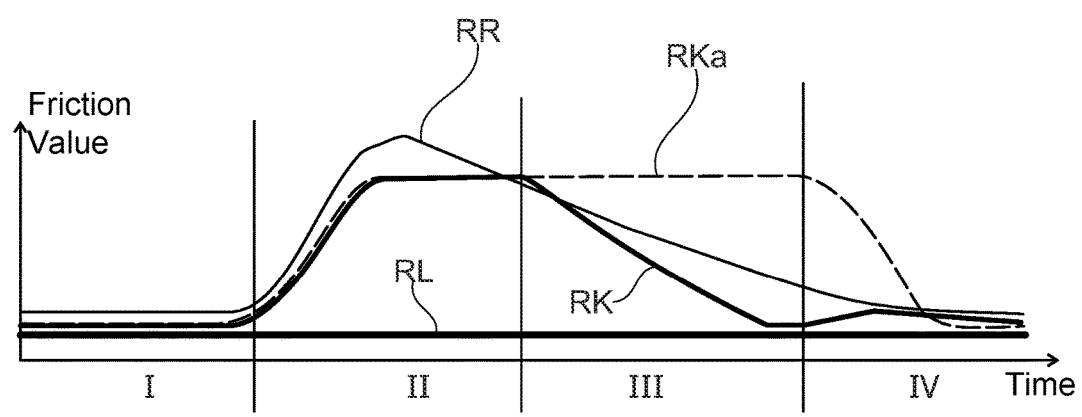
FIG. 2 an exemplary embodiment of a method according to the invention.

FIG. 2 shows an example for the behavior of the friction value of the clutch 5 of the duplex clutch transmission 1 during the operation of a motor vehicle over time. The time progression is divided into four sections I, II, III, IV, with the sections I, II, and IV representing a situation of the motor vehicle in which the clutch 5 can be monitored. Allowing monitoring means in this context that the clutch 5 operates with slippage and thus transfers torque. This torque is compared during the slipping phase with the torque of the internal combustion engine and a short-term friction value is determined therefrom, by which the clutch characteristics line can be adjusted.

Different friction values are analyzed. At first, in the individual sections the behavior of the current detected friction value RR of the clutch 5 is shown. Simultaneously the long-term friction value RL is set, which is determined as a function of the temperature. This long-term friction value RL extends almost constant in the present example. In section I continuous conditions are given for the clutch 5, so that the long-term friction value RL and the current friction value RR extend almost identically. Depending on the motor torque, here a short-term friction value RK is adapted, which is used as the foundation for adjusting the clutch characteristics line. This short-term friction value RK lags in section II, in which a power input into the clutch 5 occurs, behind the current friction value RR due to the adaptation. In this section II as well the long-term friction value RL is constant and the clutch 5 is in a monitored state.

In section III the clutch 5 changes into a non-monitored state. This can result in energy savings and/or be used to prevent the clutch 5 from overheating, thus the slippage phase is reduced to a minimum. For example, in constant driving operation commonly the active clutch 5 of the duplex clutch transmission 1 is engaged and the inactive clutch 6 of the duplex clutch transmission 1 is open or the gear is disengaged. During this section III, in which the clutch 5 cannot be monitored, the adaptation of the friction value cannot be performed. Accordingly, in this section III the short-term friction value RK is preset to the long-term friction value RL, which still extends constantly over time. If this pilot control was not provided, the former short-term friction value RKa would remain constant in this section III in a level assumed in the second section II, which in the subsequent section IV, in which the clutch 5 can be monitored again, would lead to major deviations between the current friction value RR and the short-term friction value RK. These large differences are suppressed by the pilot control of the short-term friction value RK to the long-term friction value RL during the section III of the clutch 5 that cannot be monitored, so that in section IV, in which the clutch 5 can be monitored again, a reliable adaptation of the short-term friction value RK is possible in the direction of the current friction value RR. Here, only minor differences need to be bridged.

The speed by which the short-term friction value RK is pilot controlled to the long-term friction value RL is determined as a function of relaxation rates of the clutch 5 typical for the vehicle. Additionally, the start values of the short-term friction value RK are determined from the start temperature of the clutch 5 at the onset of the pilot control phase III and a cooling term of the clutch 5 to be expected during the pilot control phase III.

LIST OF REFERENCE CHARACTERS 1 duplex clutch transmission
2 internal combustion engine
3 sub-drivetrain
4 sub-drivetrain
5 clutch
6 clutch
7 odd-numbered gear
8 even-numbered gear
9 driven shaft
10 differential
11 wheel axle
12 drive wheel
RR current friction value
RK short-term friction value
RL long-term friction value
RKa former short-term friction value

The invention claimed is:

1. A method for adapting a friction value of an automated clutch, the method comprising:
 (i) determining a current friction value (RK) by comparison with a torque of an internal combustion engine during a slipping phase of the clutch, and
 (ii) pilot controlling the current friction value (RK) to a long-term friction value (RL) during at least one of the following phases:
 (1) a non-slipping phase of the clutch, or
 (2) a non-monitoring phase of a torque signal.

2. The method according to claim 1, further comprising determining the long-term friction value (RL) as a function of temperature of the clutch.

3. The method according to claim 1, wherein the long-term friction value (RL) is constant during a phase (III) of the pilot control.

4. The method according to claim 1, further comprising determining a speed of an adjustment of the current friction value (RK) for the long-term friction value (RL) as a function of at least one of a relaxation rate or a cooling rate of the clutch.

5. The method according to claim 1, further comprising determining a start value of the current friction value (RK) as a function of a temperature of the clutch at a beginning of step (ii).

6. The method according to claim 1, further comprising determining a start value of the current friction value (RK) as a function of a cooling period of the clutch during step (ii).

7. A method for adapting a friction value of an automated clutch, the method comprising:
 (i) pre-setting a long-term friction value that is constant;
 (ii) determining a current friction value based on a comparative torque value during a slippage phase of the clutch, and
 (iii) adapting the current friction value to the long-term friction value during a constant driving operation and at least one of the following phases:
 (1) a non-slipping phase of the clutch, or
 (2) a non-monitoring phase of a torque signal.

8. The method according to claim 7, wherein step (iii) is carried out during the non-slipping phase of the clutch.

9. The method according to claim 7, wherein step (iii) is carried out during the non-monitoring phase of the torque signal.

10. The method according to claim 7, further comprising determining the long-term friction value as a function of temperature of the clutch.

11. The method according to claim 7, further comprising determining a speed of an adjustment of the current friction value for the long-term friction value as a function of at least one of a relaxation rate or a cooling rate of the clutch.

12. The method according to claim 7, further comprising determining a start value of the current friction value as a function of a temperature of the clutch at a beginning of step (iii).

13. The method according to claim 7, further comprising determining a start value of the current friction value as a function of a cooling period of the clutch during step (iii).

* * * * *